Oct. 31, 1950 J. G. INGRES ET AL 2,527,883
TRACTOR-TRAILER BRAKE SYSTEM
Filed May 5, 1948 2 Sheets-Sheet 1

FIG. 1.

Inventors
JEANNOT G. INGRES
EDWARD G. HILL
By C. L. Parker
attorney

Patented Oct. 31, 1950

2,527,883

UNITED STATES PATENT OFFICE 2,527,883

TRACTOR-TRAILER BRAKE SYSTEM

Jeannot G. Ingres and Edward G. Hill, Richmond, Va.; said Ingres assignor to Kelsey Hayes Wheel Company, Detroit, Mich., a corporation of Delaware, and said Hill assignor to Automatic Shifters, Inc., Richmond, Va., a corporation of Virginia Application May 5, 1948, Serial No. 25,148

24 Claims. (Cl. 188—3)

1

This invention relates to tractor-trailer brake systems and is an improvement over the system disclosed and claimed in the copending application of Jeannot G. Ingres, filed March 8, 1948, Serial No. 13,643.

In the conventional tractor-trailer brake system, as is well known, it is the conventional practice to employ a booster brake mechanism on the tractor and a power operated brake mechanism on the trailer, the latter being responsive to actuation of the booster brake mechanism upon operation of the brake pedal to apply the trailer brakes to a degree proportionate to application of the tractor brakes. Because of the substantial distance between the tractor booster and the relay or conversion valve mechanism which is responsive thereto for operating the trailer brakes, there is a substantial lag in the operation of the trailer brakes after the tractor brakes have been applied. This lag is quite substantial and dangerous in the absence of some means for applying the trailer brakes at least as early as the tractor brakes because of the well known action of "jack knifing." To overcome this danger, it is the common practice to arrange in the cab of the tractor a hand controlled valve operable for dumping air into the control chamber of the relay valve mechanism.

Systems of the character referred to are open to some objection even though they are sufficiently practicable to have come into wide use. In the first place, it is impossible for the operator to secure trailer brake operation simultaneously with or ahead of tractor brake operation except by first manually operating the hand controlled valve. In the second place, it is difficult with a system of this character to secure a high degree of modulation of the trailer brakes relative to the tractor brakes. This fault is due to the fact that poppet valves are employed in the relay or conversion valve mechanism and such valves are held on their seats by differential pressure. It requires a change in the pressure of the control chamber of the conversion valve to an extent in excess of the degree of energization of the booster motor before the valve elements of the conversion valve will open. Such opening movement of the poppet valves occurs suddenly and causes rapid changes in pressures in the trailer brake motors, thus preventing a well modulated trailer brake operation.

In the copending application referred to, the faults of the previous systems discussed above have been overcome in that operation of the trailer brake motors can be provided at least as early as tractor brake operation without the use of switches associated with the brake pedal, as has been proposed in certain relatively late developments. The structure of the pending application referred to, except for a separate control

2 mechanism to be referred to, depends solely upon energization of the motor of the tractor booster mechanism for operating the trailer brakes. The separate control is provided to permit the operator, at will, to operate only the trailer brakes when such action is desired.

An important object of the present invention is to provide an improved tractor-trailer brake system wherein the operation of the trailer brakes resulting from a brake pedal operation, is dependent solely upon energization of the booster motor and wherein a finely modulated trailer brake operation is provided together with means for initially energizing the trailer brake motor to a substantial extent upon operation of the brake pedal so as to effectively prevent "jack knifing."

A further object is to provide such a system wherein the conversion device is arranged on the tractor in close proximity to the booster motor to be immediately responsive thereto, and wherein electrically operable means is responsive to operation of the conversion mechanism to provide for trailer brake actuation substantially immediately upon operation of the brake pedal with no lag in the operation of the trailer brakes relative to the booster mechanism, and to provide a novel type of trailer brake control means in combination therewith.

A further object is to provide a more rapid and accurate response of the modulating means for the trailer brake motors by employing a control conduit wherein substantially static pressures rather than the substantial movement of air through the control line is depended upon to secure the trailer brake modulating action.

A further object is to provide such a system wherein the releasing of the trailer brakes upon the releasing of the brake pedal occurs extremely rapidly.

A further object is to provide a system employing an electrical control means of a simple and dependable nature, but wherein the trailer brake modulating means is of such character as to provide for complete, even if relatively slow, trailer brake operation in the event of a failure in the electrical system.

Other objects and advantages of the invention will become apparent from the following description.

In the drawings we have shown one embodiment of the invention. In this showing.

Figure 1:
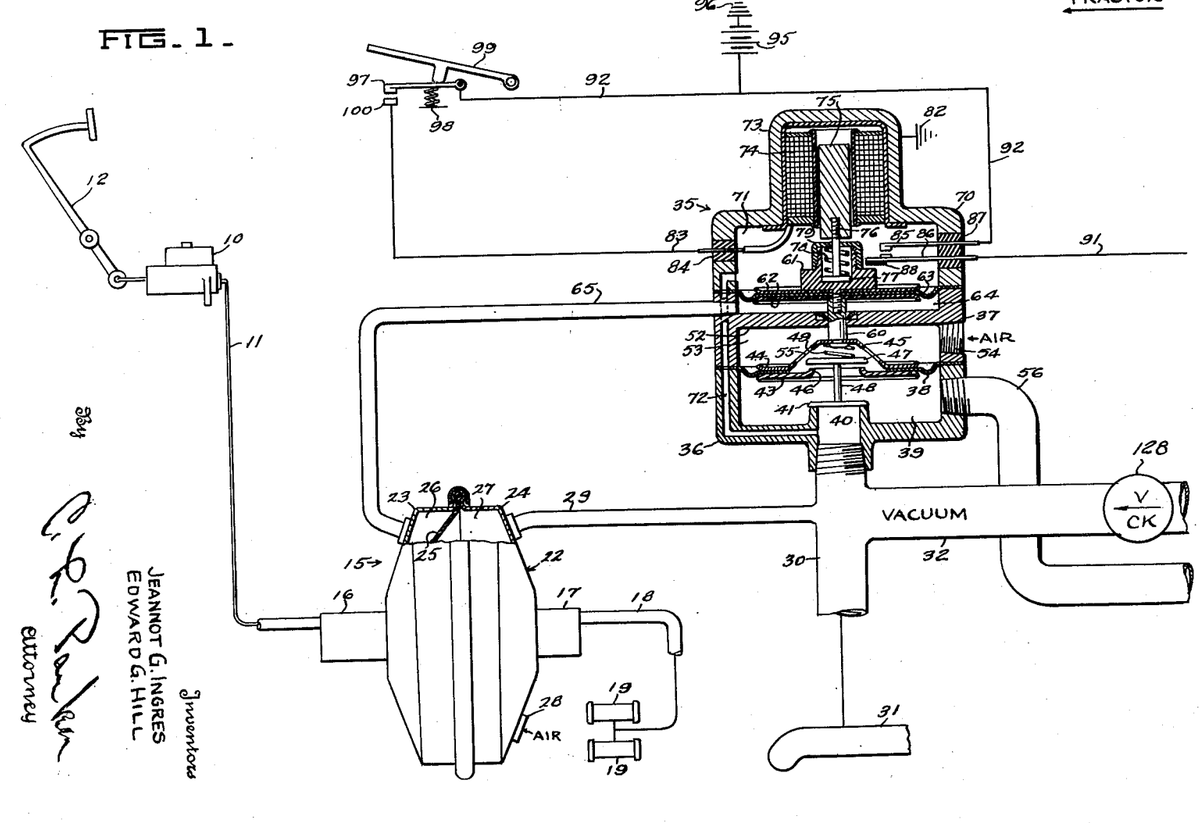
Figure 1 is a combined schematic, diagrammatic and structural view of the tractor-carried parts of the apparatus.

Referring to Figure 1, the numeral 10 designates a conventional master cylinder having the usual piston (not shown) operable for displacing fluid through a pipe line 11 upon actuation of a conventional brake pedal 12. A booster mechanism indicated as a whole by the numeral 15 is operable upon actuation of the brake pedal 12. The booster mechanism forms per se no part of the present invention and accordingly need not be illustrated and described in detail. Because of its highly desirable characteristics, it is desired to employ a booster mechanism of the type shown in the patent to Rudolph J. Klimkiewicz, No. 2,377,699, granted June 5, 1945. Such a mechanism is vacuum suspended, as is true of most vehicle brake booster mechanisms now in common use.

The booster mechanism comprises a low pressure cylinder 16 into which fluid flows from the line 11. Relatively high braking pressures are developed in a high pressure cylinder 17 from which a pipe line 18 supplies fluid under pressure to conventional brake cylinders 19 to apply the brakes. The booster mechanism 15 further comprises a differential fluid pressure motor 22 comprising casing sections 23 and 24 between which is arranged a pressure responsive unit 25 comprising a flexible diaphragm, as shown. The casing sections 23 and 24 are divided by the pressure responsive unit 25 to form a variable pressure chamber 26 and a constant pressure chamber 27. Air is admitted to the booster motor through a nipple 28, while the chamber 27 is in constant communication with a source of vacuum through a pipe 29 in a manner to be described.

As fully disclosed in the Klimkiewicz patent referred to, the chambers 26 and 27 are normally connected to each other through a suitable valve mechanism which normally disconnects the chamber 26 from the atmospheric inlet 28. Such valve mechanism is operable by fluid flowing through line 11 into the low pressure cylinder 16 to disconnect the chambers 26 and 27 from each other and to connect the chamber 26 to the atmospheric inlet 28. Such operation takes place upon actuation of the brake pedal 12 to move the pressure responsive unit 25 whereby the motor 22, assisted by the manual pressure generated by the pedal 12, generates the desired hydraulic braking pressures in the cylinder 17.

A vacuum pipe 30 communicates with the intake manifold 31 of the tractor engine to provide the necessary vacuum for operating the system. The pipe 29 is connected to the pipe 30, as shown in Figure 1, and a vacuum line 32 leads rearwardly to the trailer, as will be referred to later.

The conversion mechanism is indicated as a whole by the numeral 35 in Figure 1. This mechanism comprises a lower cup-like body 36 above which is clamped a second body member 37. A diaphragm 38 is clamped between the adjacent edges of the members 36 and 37 and this diaphragm and the body member 36 define a chamber 39 adapted to communicate with the pipe 30 through a passage 40 normally closed by a valve 41 to be further referred to later.

The diaphragm 38 is clamped between a lower plate 43 and an upper plate 44, the central portion of which forms a cage 45. The plate 43 is provided centrally thereof with a port 46 adapted to be engaged by a valve 47 connected to a stem 48, the lower end of which carries the valve 41. A spring 49 tends to urge the valve 47 downwardly and normally maintains the valve 41 on its seat.

Intermediate its top and bottom limits, the body 37 is provided with a horizontal wall 52. This wall, the side of walls of the body 37 and the diaphragm 38, define a pressure chamber 53 in open communication with the atmosphere through a port 54 preferably provided with a conventional air cleaner (not shown). The cage 45 is provided with openings 55 so that its interior communicates with the chamber 53. It will be obvious that when the valve 47 is open, the chambers 39 and 53 are in communication with each other. Upon upward movement of the cage 45 as described below, the valve 47 closes and the valve 41 opens, thus disconnecting the chamber 39 from the atmosphere and connecting it to the source of vacuum. Changes in pressure in the chamber 39 are utilized in controlling the trailer brake motors to be described, and for this purpose, a pipe 56 is connected at its forward end to the chamber 39 and extends rearwardly to the trailer.

The cage 45 is connected to a vertically extending stem 60. This stem extends through the wall 52 as shown in Figure 1 for threaded connection with a head 61. The upper end of the stem 60 and the bottom of the head 61, engage lower and upper clamping plates 62 respectively, arranged on opposite sides of a diaphragm 63 seated on the upper end of the body member 37. The space beneath the diaphragm 63 forms a chamber 64, and this chamber is in fixed communication with the variable pressure chamber 26 of the booster motor through a pipe 65. It will be understood that Figure 1 is schematic in nature, and as further referred to below, the conversion mechanism 35 is in close proximity to the booster motor 15 whereby the chamber 64 is immediately reponsive to changes in pressure in the chamber 26 incident to energization and deenergization of the booster motor 22.

A third body member 70, of generally inverted cup shape, has its lower edge clamped upon the top of the diaphragm 63 and forms therewith a chamber 71 in fixed communication with the port 40 through a suitable passage 72 formed in the body members 36, 37 and 70. The body 70 is provided with an upward axial extension 73 in which is arranged a solenoid 74 having an armature 75. The lower end of the armature is connected to a stem 76 having a head 77 at its lower end above which is arranged a compression coil spring 78. The upper end of this spring engages a cap 79 threaded on the reduced upper end of the head 61.

One side of the solenoid 74 is grounded as at 82 while the other terminal of the solenoid is connected to a lead wire 83 extending through the body 70 by means of a rubber or similar sealing plug 84. Thus this wire extends from the chamber 71 without permitting leakage between this chamber and the atmosphere.

A pair of switches 85 and 86 project into the chamber 71 through a compressible leak-proof plug 87 which excludes air from the chamber 71. The switch 86 has an insulating member 88 engageable by the head 61 to be moved thereby into engagement with the switch 85. The switch 86 is connected to a wire 91 leading rearwardly to the trailer for a purpose to be described. The switch 85 is connected to a wire 92.

A source of current such as a vehicle battery 95 has one terminal connected to the wire 92 and has its other terminal grounded as at 96. The wire 92 is connected to a switch 97 biased to open position as at 98. The switch 97 is operable by a treadle 99, preferably placed in position to be operated by the driver's left foot, and the switch is movable into engagement with a contact 100 connected to the wire 83. It will be noted that operation of the switch 97 energizes the solenoid 74, while engagement of the switch elements 85 and 86 closes the circuit through wires 91 and 92 in a manner and for a purpose to be described.

Figure 2:
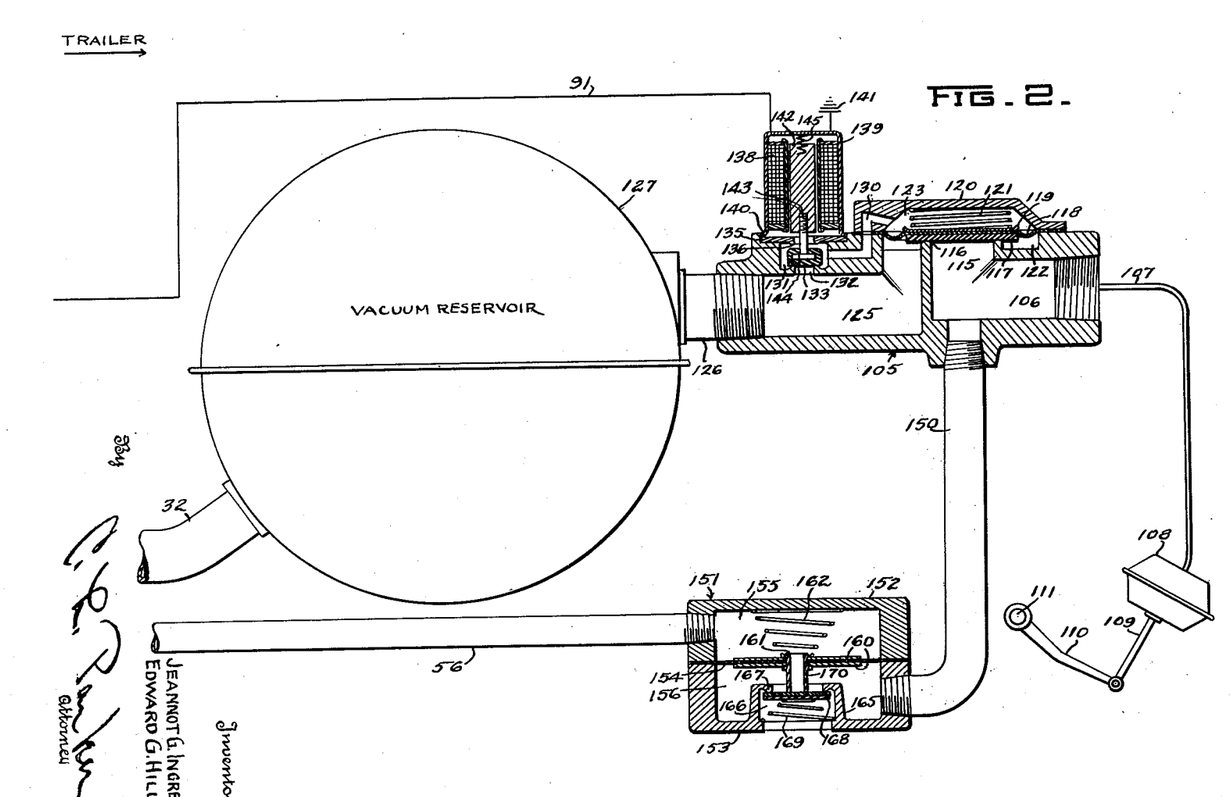
Figure 2 is a similar view of the trailer-carried parts of the apparatus.

Referring to Figure 2, the numeral 105 designates a valve body as a whole having a passage 106 to which is connected one end of a pipe line 107 leading to a trailer brake motor 108. This motor is conventional and is provided with the usual pressure responsive element (not shown) connected by a rod 109 to a crank 110 fixed to a brake-operating rock shaft 111. The bottom of the motor 108 is open to the atmosphere. The top of the motor is normally open to the atmosphere to air-suspend the motor, but is connectible to a source of vacuum in a manner to be described to apply the trailer brakes. Only one of the motors 108 has been illustrated, but it will be apparent that the conventional number will be used, depending upon the nature of the trailer.

The passage 106 turns upwardly as at 115 and terminates in a valve seat 116 engageable by a valve 117. A diaphragm 118 is clamped between the valve 117 and an upper clamping plate 119. A cap 120 is arranged on the top of the valve body 105 and a spring 121 is arranged as shown in Figure 2 to urge the valve 117 into engagement with its seat. The diaphragm 118 is clamped in position by the peripheral portions of the cap 120, and chambers 122 and 123 are defined below and above the diaphragm 118.

The chamber 122 communicates with a passage 125 connected as at 126 to a vacuum reservoir 127. This reservoir is connected to the pipe 32 which has arranged therein a suitable check valve 128 to prevent any rises in pressure in the manifold from affecting the vacuum system including the reservoir 127.

The valve body 105 and cap 120 are provided with a passage 130 affording communication between the chamber 123 and a valve chamber 131. This chamber has a port 132 to afford communication with the passage 125 and this port is normally closed by a double faced rubber or similar valve 133 to be further referred to later. A plate 135 forms the top of the chamber 131 and is provided with a central passage 136 engageable by the top of the valve 133.

A solenoid 138 is arranged over the plate 135 in a housing 139 apertured as at 140 to vent the port 136 to the atmosphere. The solenoid 138 has one terminal connected to the wire 91 and has its other terminal grounded as at 141.

The solenoid is provided with an armature 142 the lower end of which has threaded connection with a stem 143. At its lower end, the stem 143 carries a head 144 arranged in the valve 133. The armature 142 is biased downwardly by a spring 145 whereby the valve 133 normally closes the port 132. Under such conditions, the chamber 123 is vented to the atmosphere through passage 130, chamber 131 and ports 136 and 140. When the solenoid 138 is energized, the valve 133 closes the port 136 and connects the chamber 123 to the vacuum passage 125 as will be obvious.

A pipe 150 is tapped into the body 105 to communicate with the passage 106. A control valve indicated as a whole by the numeral 151 has cup-shaped body members 152 and 153 arranged with their edges facing each other and clamping therebetween a diaphragm 154. This diaphragm divides the body of the valve mechanism to provide chambers 155 and 156, and the other end of the pipe 150 is tapped into the valve body 153 to communicate with the chamber 156.

The diaphragm 154 is clamped between plates 160 which carry an open ended tube 161 obviously having its upper end in fixed communication with the chamber 155. A light compression spring 162 urges the diaphragm assembly and tube 161 downwardly approximately to the position shown in Figure 2.

The valve body 153 is provided with an internal upstanding flange 165 forming an atmospheric passage 166 provided at its upper end with a valve seat 167. A valve 168 is engageable with this seat and is urged upwardly by a spring 169. The lower end of the tube 161 normally seats on the valve 168, and the tube is provided with a bleed port 170 to provide limited communication between the chambers 155 and 156 when the tube 161 engages the valve 168, for a purpose to be described. The pipe 56, previously described, is tapped into the valve body 152 to communicate with the chamber 155.

*Operation*

The parts of the apparatus normally occupy the positions shown in the drawings, the valve 41 (Figure 1) being closed to disconnect the pipe 56 from the vacuum pipe 30. The valve 117 (Figure 2) will be seated and the trailer brake motor 108 will be air suspended due to the fact that the valve 168 is normally "cracked." Both switches 97 and 85, 86 will be open.

Assuming that the operator desires to apply the brakes to an average or substantial extent, he will depress the brake pedal 12 in the usual manner. Brake fluid will be displaced from the master cylinder 10 through line 11 into the low pressure cylinder 16, thus energizing the motor 22 in accordance with the operation of whatever type booster motor is employed, for example as fully described in the Klimkiewicz Patent No. 2,377,699, referred to above. In such case, the valve mechanism of the booster will disconnect chambers 26 and 27 and admit air into the chamber 26, as fully disclosed in the Klimkiewicz patent referred to. The motor will thus start to function to generate braking pressures in the cylinder 17 and fluid will be displaced through line 18 to operate the brake cylinders 19. This operation first takes up the slack in the brake shoes and then increases the static pressure in the brake lines to apply the brakes in the conventional manner.

In practice, the relay mechanism 35 (Figure 1) will be arranged in close proximity to the booster motor whereby changes in pressures in the chamber 64 will occur substantially instantaneously with changes in the chamber 26.

A rise in pressure in the chamber 26 upon energization of the motor 22 will cause a rise in pressure in the chamber 64. It will be noted that balanced vacuum will exist in the chambers 64 and 71, the motor 22 being normally vacuum suspended and the chamber 71 being in fixed communication with the vacuum source through passage 72. Balanced atmospheric pressure will exist in chambers 39 and 53, the valve 47 being normally open and the port 54 being in fixed communication with the atmosphere. Upon an increase in pressure in the chamber 64 when the booster motor 22 is energized, therefore, there will be a net upward pressure affecting the diaphragm assemblies of the relay mechanism 35. The diaphragms 38 and 63 accordingly move upwardly with their associated elements and the seat 46 engages the valve 47 to close communication between chambers 39 and 53. A slight further upward movement will be transmitted from the valve 47 to the valve 41 to unseat the latter and thus connect the chamber 39 to the vacuum pipe 30 to exhaust air from the pipe 56.

In this connection it will be noted that no substantial volume of air moves through pipe 56 as is customary in the control lines of tractor-trailer brake systems. It is the substantial movement of air, coupled with the lengths of the control pipes, line friction, etc., which causes the substantial time lag incident to operation of trailer brakes in conventional systems. While the valve mechanism 151 operates in an entirely different manner from conventional systems, its operation is extremely prompt since the opening of the valve 41, in effect, merely changes the static pressure in the line 56 and chamber 155 except for the slight flow of air through the small port 170. The operation of the valve mechanism 151 will be further referred to below.

Assuming that the brake application is average or substantial, the upward movement of the diaphragm assembly of the relay mechanism 35 will cause the cap 61 to move the switch 86 into engagement with the switch 85. This closes a circuit from source 95 through wires 92 and 91, through solenoid 138 and back to the source through grounds 141 and 96. The solenoid 138 thus will be energized to move its armature 142 upwardly to open the port 132 and close the port 136. The chamber 123 accordingly will be connected to the vacuum passage 125 and atmospheric pressure beneath the valve 117 will open this valve to connect the passage 106 to the passage 125. This operation energizes the trailer brake motor 108 to apply the trailer brakes. It will be apparent that energization of the solenoid 138 takes place instantaneously upon the closing of the switch 85, 86, and this switch will be closed before any application of the tractor brakes has taken place. This is due to the fact that the pipe line 65 is short and the chamber 64 is closed and accordingly the chamber 64 has its static pressure varied substantially instantaneously with variations in the chamber 125. This operation is so extremely rapid that the switch 85, 86 will be closed before application of the tractor brakes since, while such brake application is rapid it is not instantaneous due to the friction of the parts, line friction of the fluid flowing through pipe 18 and the slight time element required to move the brake shoes into engagement with the drums. The reservoir 127 and valve mechanism 105 being arranged in close proximity to the trailer brake motors, it has been found in practice with the present brake system the trailer brake motors will be operated substantially simultaneously with the tractor brakes. It is accordingly unnecessary with the present system to provide a hand controlled valve to assure the setting of the trailer brakes ahead of the tractor brakes.

The power operation of the valve 117 (Figure 2) permits the use of a valve and valve seat of substantial area. Accordingly, when the valve 117 is opened the exhaustion of air from the trailer brake motors is extremely rapid and initial application of the trailer brakes takes place to a greater extent than initial application of the tractor brakes. The application of the trailer brakes simultaneously with the tractor brakes and to a greater extent than tractor brake application positively insures against "jack knifing" which is a serious defect in present systems and requires the use of a separate hand valve as previously stated.

While the trailer brakes will be initially set to a substantial extent in the manner stated, their application quite promptly tapers off to an application in proportion to operation of the booster motor 22. Vacuum in the passage 106 is communicated through the pipe 150 to the chamber 156, thus establishing lower pressure beneath the diaphragm 154 and moving this diaphragm downwardly whereby the tube 161 opens the valve 168 to dump air into the chamber 156 and through pipe 150, passage 106 and line 107 into the trailer brake motors.

When pressures in the chambers 155 and 156 come into approximate balance, the valve 168 will return substantially to closed position. As previously pointed out, pressure in the chamber 155 drops quite rapidly upon opening movement of the valve 41. This valve opens quite rapidly when the booster brake is energized and the diaphragm assembly of Figure 1 moves upwardly. However, atmospheric pressure in the chamber 53 quickly opposes upward movement of the valve 41 after the latter is opened, and the total vertically acting pressures in the various chambers of the relay mechanism 35 will depend upon pressure in the chamber 64 as determined by the degree of energization of the booster motor 22. While there will be a sudden drop in pressure in the chamber 39 upon the opening of the valve 41, this pressure very quickly reaches a point proportional to the degree of energization of the booster motor 22 to determine the proper proportionate pressure in the chamber 155.

Accordingly it will be apparent that the present system functions to provide an extremely rapid application of the trailer brakes and initial application of the trailer brakes takes place to an extent greater than the normal proportionate application of these brakes relative to the tractor brakes. This being true, and trailer brake application taking place simultaneously with tractor brake application, it will be apparent that "jack knifing" is effectively prevented. It also will be apparent, however, that it is only the initial trailer brake application which is disproportionate to tractor brake application. After the initial surge of differential pressures in the trailer brake motors applies the trailer brakes in the manner referred to, the energization of the trailer brake motors will be reduced, if necessary, to provide the desired proportionate application to the tractor brake application. For example, if in a given application of the trailer brakes the differential pressure developed in the trailer brake motors corresponds to seven inches of mercury due to a tractor brake application in which the booster motor 22 is energized to an extent corresponding to five inches of mercury, differential pressures in the trailer brake motors will quickly drop off to the proper degree proportionate to tractor brake application.

Assuming that a substantial application of the trailer brakes is being made, the pressures developed in the trailer brakes will exceed pressures developed in the tractor brakes upon initial application. However, the booster motor 22 will develop higher pressures in the cylinder 17 relatively rapidly and before trailer brake pressures can drop off. Under such conditions, the initial energization of the trailer brake motors will be maintained and will pick up as energization of the booster motor 22 progresses. This is due to the fact that if the tractor brakes are relatively heavily applied, the previously described operation of the diaphragm assembly in the relay mechanism 35 (Figure 1) will result in a substantial unseating of the valve 41 and the maintenance of this valve off its seat for an appreciable length of time. The result will be a substantial lowering of the pressure in the chamber 155 (Figure 1) thus preventing lowered pressures in the chamber 156 incident to initial trailer brake operation, from moving the diaphragm 154 downwardly. Ordinarily under such relatively heavy brake application, therefore, the lower end of the tube 170 is prevented from unseating the air valve 168 and relatively high vacuum conditions will be maintained in the trailer brake motor lines.

Proportionate energization of the trailer brake motors is, of course, determined by operation of the valve 151. Whenever higher vacuum exists in the chamber 156 than in the chamber 155, the diaphragm 154 will move downwardly to unseat the air valve 168 to whatever extent is necessary to provide the proper proportionate trailer brake operation. Conversely, lower pressure in the chamber 155 than in the chamber 156 will disengage the lower end of the tube 161 for engagement with the valve 168 to establish the desired proportional higher vacuum in the chamber 156 and consequently in the trailer brake motors.

It will be apparent that the switches 85 and 86 in any regular brake application are closed only for a relatively short period of time. After the valve 47 (Figure 1) is closed and the valve 41 is opened in the manner previously stated, lower pressures in the chamber 39 will move the diaphragm assembly of the relay mechanism 35 downwardly, to release the switch 86 from the switch 85. Unless a further and heavier brake application subsequently takes place before the brakes are released, the switches 85 and 86 will remain open. Accordingly the solenoid 138, after a short period of energization will become de-energized and the valve 117 will close.

The valve 117 accordingly functions to provide extremely rapid initial energization of the brake motors and then passes out of operation and subsequent energization of the trailer brake motors is controlled by the vacuum mechanism 151 in accordance with the position of the diaphragm assembly of the relay mechanism 35 which, in turn, determines the positions of the valves 41 and 47. It requires some little force to unseat the valve 41 upon initial operation of the brakes but this is unimportant since it does not delay the application of the trailer brakes, energization of the latter being initially effected in most brake applications by energization of the solenoid 138.

After the valve 117 has closed, the trailer brake motors are wholly controlled by the valve mechanism 151 in a manner to be described. Any slight slacking off of the brake pedal will partially deenergize the booster motor 22 and lower pressures in the chambers 64 (Figure 1) to seat the valve 41 and crack the valve 47 to raise pressures in the chamber 155 (Figure 2) and thus open the air valve 168 until proper relative pressures are established in chambers 155 and 156. Conversely any slight increase in brake application will increase the pressure in the chamber 64 to lift the valve 41 from its seat and lower pressure in the chamber 155. This will result in a lowering in the pressure in the chamber 156 either through the bleed port 170 alone or by lifting the tube 161 from engagement with valve 168. Slight changes in pressures in the chambers 155 will be taken care of through the port 170 and more rapid changes in pressure will either unseat the valve 168 or lift the tube 161 from engagement therewith.

When the brake pedal 12 is released to disengage the brakes, the booster motor 22 will again become vacuum suspended and the tractor brakes will be released in the conventional manner. Pressure in the chamber 64 (Figure 1) will drop to the pressure in the motor chamber 26, thus restoring the parts of the relay mechanism 35 to the positions shown in Figure 1. Atmospheric pressure will be re-established in chamber 39 and, through pipe 56, in the chamber 155 to move the diaphragm 154 downwardly and unseat the valve 168 until atmospheric pressure is established in the chamber 156 and in the various lines and passages leading to the trailer brake motors.

The port 170 (Figure 2) is not essential to the operation of the system and may be eliminated. Its use is preferred, however, to prevent any surging action of the parts of the valve mechanism 151. For example, if the trailer brake motors are fully energized and a slight releasing of the brake pedal takes place, pressure will increase in the chamber 155 in the manner described. Without the port 170, any such increase in pressure in the chamber 155 would unseat the valve 168 and sometimes cause too rapid pressure increases in the chamber 156. Such action is minimized by the port 170, the leakage therethrough tending to cushion downward movement of the tube 161 since pressures between the chambers 155 and 156 can be slowly balanced through the port 170. Similarly, when there is a slight decrease in pressure in the chamber 155 incident to a slow operation of the brake pedal, for example, in slightly increasing the degree of brake application, slow movement of the diaphragm 154 will occur and pressures in the chambers 155 and 156 will be balanced through the port 170. Thus this port minimizes movement of the tube 161 and valve 168 and tends to prevent overrunning of these elements during any change in position thereof.

The functioning of the solenoid 74 (Figure 1) is an important adjunct to the present system for two reasons. When an operator desires to provide a slight brake snubbing operation, for example in going down a slight incline, it will be unnecessary for him to operate the brake pedal 12. The treadle 99 is preferably located adjacent the driver's left foot and such foot may remain in position on the treadle 99 except when the clutch pedal is to be operated. By depressing the treadle 99 a circuit will be closed from source 95 through wire 92, switch 97, contact 100, wire 83 and thence through solenoid 74 and back to the source through grounds 82 and 96. The armature 75 will be moved upwardly and the diaphragm assembly of the relay mechanism 35 will be moved upwardly, motion being transmitted to the cap 79 through spring 78. This operation will close the switch 85, 86 to connect the passage 106 (Figure 2) to the vacuum reservoir 127 in the manner previously described.

The operation referred to also will close the valve 47 and open the valve 41 to lower the pressure in the chamber 155, and accordingly the valve mechanism 151 again takes over the controlling of the degree of energization of the trailer brake motors. The establishment of vacuum in the chamber 39 (Figure 1) opposes upward movement of the armature 75, and the tension of the spring 78 will determine how much differential pressure on the diaphragm 38 is necessary to seat the valve 41. The valve mechanism 151 (Figure 2) will then function to determine the degree of application of the trailer brakes.

It will be apparent that when the treadle 99 is depressed, a fixed degree of trailer brake application will occur and will be determined by the valve mechanism 151 in accordance with the loading of the spring 78 (Figure 1). The parts are restored to normal position merely by releasing the treadle 99. Under such conditions, the solenoid 74 will be deenergized to release the tension of the spring 78 whereupon the diaphragm assembly of the valve mechanism 35 will return to the position shown in Figure 1. The valve 41 will close and the valve 47 will open, thus admitting atmospheric pressure into the chamber 39 and consequently into the chamber 155 of the valve mechanism 151. The diaphragm 154 will then move downwardly to open the air valve 168 and deenergize the trailer brake motors, as described.

It will be apparent from the foregoing that the relay mechanism 35 is operable either through energization of the booster motor 22 or by energization of the solenoid 74. In the former, energization of the booster motor 22 will be determined by brake pedal operation to consequently determine pressures in the chamber 64. Trailer brake operation accordingly will occur proportionate to tractor brake operation. When the treadle 99 is operated to provide the trailer brake application referred to, a fixed degree of application will occur depending upon the upward forces imposed on the diaphragm assembly of the relay mechanism through the spring 78.

The two means for operating the relay mechanism 35 to apply the trailer brakes may be simultaneously operable to provide a heavier degree of trailer brake operation when the trailer is heavily loaded. This is highly important in the present mechanism. It will be apparent that energization of the booster motor 22 to a predetermined extent provides an increased pressure in the chamber 64 to a proportionate degree, and the increased pressure in the chamber 64 will determine the upward forces transmitted to the diaphragm assembly in Figure 1 in accordance with booster brake operation. Energization of the solenoid 74 by operating the treadle 99 creates an upward force on the diaphragm assembly in Figure 1 is accordance with the loading of the spring 78. When the brake pedal 12 and treadle 99 are simultaneously operated, the sum of the forces corresponding to pressure in the chamber 64 and the loading of the spring 78 will act upwardly on the diaphragm assembly of the valve mechanism 35. This being the case, it will require a higher degree of vacuum in the chamber 39 to close the valve 41. This higher vacuum will also be present in the chamber 155 (Figure 2) and accordingly a higher vacuum must be established in the trailer brake motors before the valve mechanism 151 functions to prevent further energization of the trailer brakes.

The valve mechanism 151 always functions to determine the degree of trailer brake application. This degree of trailer brake application, in turn, will depend upon whether the treadle 99 or brake pedal 12 have been operated independently or simultaneously. Accordingly the present system provides means for snubbing the trailer brakes through operation of the treadle 99; it provides means for securing trailer brake application proportionate to energization of the booster motor 22 up to a predetermined maximum extent; and it provides means for securing an even higher trailer brake application when the treadle 99 and pedal 12 are both operated. The close proximity of the valve mechanism 35 to the booster motor renders such valve mechanism immediately responsive to energization of the booster motor and the solenoid 138 (Figure 2) will be energized before any substantial tractor brake operation can occur. This action results in unseating the relatively large valve 117 to provide an unusually rapid exhaustion of air from the variable pressure chambers of the trailer brake motors. In practice, it has been found that the present system, without operation of the treadle 99, effects trailer brake operation simultaneously with tractor brake operation, thus preventing "jack knifing." Moreover, the valve 117 functions to provide an initial trailer brake application to a substantial extent and above a degree proportionate to initial tractor brake operation to doubly insure against "jack knifing." However, trailer brake application very quickly is reduced by the valve mechanism 151 to make it proportionate to tractor brake application.

While the operation of the valve 117 (Figure 2) is important in the normal functioning of the apparatus for the reasons stated, a failure of the electrical system will not render the apparatus completely inoperative. If energization of the solenoid 138 fails upon closing the switch 85, 86 for any reason, the opening of the valve 41 connects the chamber 155 (Figure 2) to the source of vacuum and lifts the tube 161 to supply vacuum to the trailer brake motors until they are energized to a degree proportionate to energization of the tractor brakes, whereupon the parts of the modulating valve mechanism 151 will return to normal position. This operation is slower than the intended operation of the apparatus since it does not substantially instantaneously evacuate the variable pressure chambers of the trailer brake motors. It is necessary to move a volume of air through the line 56 to secure operation of the trailer brakes in this manner, thus rendering the operation of the system slower than when the valve 117 functions. However, it does allow for complete braking and the system is at least sufficiently operative under such conditions to permit the tractor-trailer combination to be driven at reasonable speeds until suitable repairs can be made.

We claim:

1. A tractor-trailer brake system comprising a booster mechanism for applying the tractor brakes, a trailer brake motor for applying the trailer brakes, and a control mechanism for said trailer brake motor, said control mechanism comprising a pair of devices one of which is subject to control in accordance with the degree of energization of said booster mechanism and is operable to effect energization of said trailer brake motor, the other device being operable for limiting the energization of said trailer brake motor, one of said devices comprising a switch, a solenoid in circuit with said switch, and a valve arranged to be opened upon energization of said solenoid.

2. A tractor-trailer brake system comprising a booster mechanism for applying the tractor brakes, a trailer brake motor for applying the trailer brakes, and a control mechanism for said trailer brake motor, said control mechanism comprising a pair of devices one of which comprises an electric circuit including a switch arranged to be closed upon a predetermined energization of said booster mechanism and a solenoid energizable when said switch is closed, and a valve arranged to be opened upon energization of said solenoid to energize said trailer brake motor, the other device having connection with said trailer brake motor to limit energization of said trailer brake motor by said one device.

3. A tractor-trailer brake system comprising a booster mechanism for applying the tractor brakes, a trailer brake motor for applying the trailer brakes, and a control mechanism for said trailer brake motor, said control mechanism comprising means mounted on the tractor and having a pressure chamber in proximity to and communicating with said booster mechanism whereby its pressure is varied in accordance with the degree of energization of the booster mechanism, a device operable by changes in pressure in said chamber incident to energization of the booster mechanism for energizing said trailer brake motor, and a second device for rendering said first named device inoperative after said trailer brake motor has been energized to a predetermined extent.

4. A tractor-trailer brake system comprising a booster mechanism for applying the tractor brakes, a trailer brake motor for applying the trailer brakes, and a control mechanism for said trailer brake motor, said control mechanism comprising means mounted on the tractor and having a pressure chamber in proximity to and communicating with said booster mechanism whereby its pressure is varied in accordance with the degree of energization of the booster mechanism, a device operable by changes in pressure in said chamber incident to energization of the booster mechanism for energizing said trailer brake motor, and a second device for rendering said first named device inoperative after said trailer brake motor has been energized to a predetermined extent, said second device comprising a control valve device for controlling energization of said trailer brake motor to a degree proportionate to energization of said booster mechanism.

5. A tractor-trailer brake system comprising a booster mechanism for applying the tractor brakes, a trailer brake motor for applying the trailer brakes, and a control mechanism for said trailer brake motor, said control mechanism comprising means mounted on the tractor and having a pressure chamber in proximity to and communicating with said booster mechanism whereby its pressure is varied in accordance with the degree of energization of the booster mechanism, a device operable by changes in pressure in said chamber incident to energization of the booster mechanism for energizing said trailer brake motor, and a second device for rendering said first named device inoperative after said trailer brake motor has been energized to a predetermined extent, said second device comprising a pressure responsive element responsive to the degree of energization of said trailer brake motor for rendering said first named device inoperative after said trailer brake motor has been energized to a predetermined extent.

6. A tractor-trailer brake system comprising a booster mechanism for applying the tractor brakes, a trailer brake motor for applying the trailer brakes, and a control mechanism for said trailer brake motor, said control mechanism comprising means mounted on the tractor and having a pressure chamber in proximity to and communicating with said booster mechanism whereby its pressure is varied in accordance with the degree of energization of the booster mechanism, a device operable by changes in pressure in said chamber incident to energization of the booster mechanism for energizing said trailer brake motor, a second device comprising a second chamber and a pressure responsive element movable in accordance with pressures in said second chamber, and means for varying pressures in said second chamber to oppose pressures in said first named chamber to render said first named device inoperative after said trailer brake motor has been energized to a predetermined extent.

7. Apparatus constructed in accordance with claim 6 wherein the means for controlling pressures in said second chamber comprises a control device for controlling energization of said trailer brake motor whereby such motor will be energized to a degree proportionate to energization of said booster mechanism.

8. A tractor-trailer brake system comprising a booster mechanism for applying the tractor brakes and including a booster motor having a constant pressure chamber and a variable pressure chamber, a trailer brake motor for applying the trailer brakes, and a control mechanism for said trailer brake motor, said control mechanism comprising a first chamber communicating with said variable pressure chamber, a pressure responsive element movable in one direction by variations in pressure in said first pressure chamber incident to energization of said booster motor, a control device comprising a control circuit having a switch therein movable to closed position upon movement of said pressure responsive element in said direction to energize the trailer brake motor, and means operable upon energization of the trailer brake motor to a predetermined extent for breaking said circuit to prevent further energization of said trailer brake motor.

9. A tractor-trailer brake system comprising a booster mechanism for applying the tractor brakes and including a booster motor having a constant pressure chamber and a variable pressure chamber, a trailer brake motor for applying the trailer brakes, and a control mechanism for said trailer brake motor, said control mechanism comprising a first chamber communicating with said variable pressure chamber, a pressure responsive element movable in one direction by variations in pressure in said first pressure chamber incident to energization of said booster motor, a control device comprising a control circuit having a switch therein movable to closed position upon movement of said pressure responsive element in said direction to energize the trailer brake motor, and means comprising a pressure responsive device for transmitting a force to said pressure responsive element to move it in the opposite direction to open said switch when said trailer brake motor is energized to a predetermined extent.

10. Apparatus constructed in accordance with claim 9 wherein said means comprises a control device for controlling the degree of energization of said trailer brake motor in accordance with the degree of energization of said booster motor wholly independently of said circuit.

11. A tractor-trailer brake system comprising a booster mechanism for applying the tractor brakes and including a booster motor having a constant pressure chamber and a variable pressure chamber, a trailer brake motor for applying the trailer brakes, and a control mechanism for said trailer brake motor, said control mechanism comprising a first chamber communicating with said variable pressure chamber, a pressure responsive element movable in one direction by variations in pressure in said first pressure chamber incident to energization of said booster motor, a control device comprising a control circuit having a switch therein movable to closed position upon movement of said pressure responsive element in said direction to energize the trailer brake motor, a second pressure chamber, a second pressure responsive element responsive to pressures in said second chamber and mechanically connected to said first named pressure responsive element, and means for effecting a change in pressure in said second pressure chamber when said trailer brake motor is energized to a predetermined extent to cause said second pressure responsive element to move said first named pressure responsive element in the opposite direction to open said switch.

12. Apparatus constructed in accordance with claim 11 wherein the means for controlling pressures in said second pressure chamber comprises a valve operable by said first named pressure responsive element for connecting said second chamber to a source of pressure differential, and a control valve mechanism for controlling the effectiveness of the pressure in said source for changing the pressure in said second pressure chamber in accordance with the degree of energization of said trailer brake motor relative to the pressure in said first pressure chamber.

13. A tractor-trailer brake system comprising a booster mechanism for applying the trailer brakes and including a booster motor having a constant pressure chamber and a variable pressure chamber, a trailer brake motor for applying the trailer brakes, a source of vacuum for said trailer brake motor, and a control mechanism for said trailer brake motor, said control mechanism comprising a normally closed valve between the trailer brake motor and said source, electrically operable means, including a switch, energizable for effecting movement of said valve to open position, pressure responsive means on the tractor in proximity to said booster motor for closing said switch upon a predetermined change in pressure in said variable pressure chamber, and means controlled in accordance with the degree of energization of said trailer brake motor for creating a force opposing said pressure responsive means to open said switch.

14. A tractor-trailer brake system comprising a booster mechanism for applying the trailer brakes and including a booster motor having a constant pressure chamber and a variable pressure chamber, a trailer brake motor for applying the trailer brakes, a source of vacuum for said trailer brake motor, and a control mechanism for said trailer brake motor, said control mechanism comprising a normally closed valve between the trailer brake motor and said source, electrically operable means, including a switch, energizable for effecting movement of said valve to open position, pressure responsive means on the tractor in proximity to said booster motor for closing said switch upon a predetermined change in pressure in said variable pressure chamber, a second pressure responsive means connected to said first named pressure responsive means, and means for subjecting said second pressure responsive means to pressure forces for overcoming the forces generated by said first named pressure responsive means to open said switch when said trailer brake motor is energized to a predetermined extent.

15. A tractor-trailer brake system comprising a booster mechanism for applying the trailer brakes and including a booster motor having a constant pressure chamber and a variable pressure chamber, a trailer brake motor for applying the trailer brakes, a source of vacuum for said trailer brake motor, and a control mechanism for said trailer brake motor, said control mechanism comprising a normally closed valve between the trailer brake motor and said source, electrically operable means, including a switch, energizable for effecting movement of said valve to open position, pressure responsive means on the tractor in proximity to said booster motor for closing said switch upon a predetermined change in pressure in said variable pressure chamber, a second pressure responsive means connected to said first named pressure responsive means, and having a pressure chamber and air and vacuum valves for controlling the connection of such chamber respectively to the atmosphere or to a source of vacuum, movement of said second pressure responsive means by said first named pressure responsive means opening the vacuum valve and closing the air valve to lower the pressure in said pressure chamber to oppose the force of said first named pressure responsive means, and means for controlling the degree of the lowering of the pressure in said pressure chamber in accordance with the degree of energization of said trailer brake motor whereby said switch will be opened when said trailer brake motor is energized to a predetermined extent.

16. Apparatus constructed in accordance with claim 15 wherein said last named means comprises a control valve mechanism for controlling the energization of said trailer brake motor in accordance with the energization of said booster motor.

17. Apparatus constructed in accordance with claim 15 wherein said last named means comprises a control valve mechanism having a pair of chambers one of which communicates with the trailer brake motor and the other of which communicates with said pressure chamber, a diaphragm dividing the chambers of said pair, and means for controlling the degree of communication between the chambers of said pair and between the first mentioned chamber of said pair and the atmosphere whereby said trailer brake motor will be energized to a degree proportional to the energization of said booster motor.

18. Apparatus constructed in accordance with claim 15 wherein said last named means comprises a control valve mechanism having a pair of chambers one of which communicates with the trailer brake motor and the other of which communicates with said pressure chamber, a diaphragm dividing the chambers of said pair, a port through which air is adapted to be admitted into the chamber of said pair communicating with said trailer brake motor, a control valve normally closing said port, and a tube carried by said diaphragm and having its lower end engaging said control valve to effect opening movement thereof when pressure in the second mentioned chamber of said pair exceeds pressure in the first mentioned chamber of said pair, said tube affording communication between the chambers of said pair upon a reversal of the relative pressures in the chambers of said pair to connect said trailer brake motor to said pressure chamber.

19. Apparatus constructed in accordance with claim 15 wherein said last named means comprises a control valve mechanism having a pair of chambers one of which communicates with the trailer brake motor and the other of which communicates with said pressure chamber, a diaphragm dividing the chambers of said pair, a port through which air is adapted to be admitted into the chamber of said pair communicating with said trailer brake motor, a control valve normally closing said port, and a tube carried by said diaphragm and having its lower end engaging said control valve to effect opening movement thereof when pressure in the second mentioned chamber of said pair exceeds pressure in the first mentioned chamber of said pair, said tube affording communication between the chambers of said pair upon a reversal of the relative pressures in the chambers of said pair to connect said trailer brake motor to said pressure chamber, said tube having a small port therethrough to provide limited fixed communication between the chambers of said pair.

20. A tractor-tractor brake system comprising a booster mechanism for applying the trailer brakes, a fluid pressure operated trailer brake motor for applying the trailer brakes and a control mechanism for said trailer brake motor comprising means responsive to energization of said booster mechanism and including a member movable in one direction upon energization of said booster mechanism for connecting said trailer brake motor to a source of differential pressure, a chamber, a pressure responsive element responsive to pressures in said chamber and connected to said movable member to be moved therewith in said direction upon energization of said booster mechanism, a valve connected to said pressure responsive element for connecting siad chamber to a source of pressure differential, when said pressure responsive member is moved in said direction by said member, to change the pressure in said chamber and provide a force opposing movement of said pressure responsive element in said direction, a conduit connected to one end of said chamber, and a control mechanism connected to said conduit and to the trailer brake motor and responsive to relative pressures therein for determining the effectiveness of changes in pressure in said chamber for opposing movement of said member and said pressure responsive element in said direction.

21. A tractor-trailer brake system comprising a booster mechanism for applying the trailer brakes, a fluid pressure operated trailer brake motor for applying the trailer brakes and a control mechanism for said trailer brake motor comprising means responsive to energization of said booster mechanism and including a member movable in one direction upon energization of said booster mechanism for connecting said trailer brake motor to a source of differential pressure, a chamber, a pressure responsive element responsive to pressures in said chamber and connected to said movable member to be moved therewith in said direction upon energization of said booster mechanism, a valve connected to said pressure responsive element for connecting said chamber to a source of pressure differential, when said pressure responsive member is moved in said direction by said member, to change the pressure in said chamber and provide a force opposing movement of said pressure responsive element in said direction, a conduit connected to one end of said chamber, and a control mechanism comprising a casing having a pair of chambers and a diaphragm therebetween, one of said chambers communicating with said conduit and the other with said trailer brake motor, and means operable by said diaphragm in accordance with relative pressures in the chambers of said pair for connecting such chambers to each other or for connecting the second mentioned chamber of said pair to the atmosphere.

22. Apparatus constructed in accordance with claim 21 provided with a bleed port affording fixed limited communication between the chambers of said pair.

23. A tractor-trailer brake system comprising a booster mechanism for applying the trailer brakes, a fluid pressure operated trailer brake motor for applying the trailer brakes and a control mechanism for said trailer brake motor comprising means responsive to energization of said booster mechanism and including a member movable in one direction upon energization of said booster mechanism for connecting said trailer brake motor to a source of differential pressure, a chamber, a pressure responsive element responsive to pressure in said chamber and connected to said movable member to be moved therewith in said direction upon energization of said booster mechanism, a valve connected to said pressure responsive element for connecting said chamber to a source of pressure differential, when said pressure responsive member is moved in said direction by said member, to change the pressure in said chamber and provide a force opposing movement of said pressure responsive element in said direction, a conduit connected to one end of said chamber, and a control mechanism having a casing provided with a diaphragm dividing it into a pair of chambers one of which communicates with said conduit and the other of which communicates with said trailer brake motor, a valve controlling communication between the second mentioned chamber of said pair and the atmosphere, and an open-ended tube carried by said diaphragm and engageable with said last named valve to open it and disengageable from such valve to connect the chambers of said pair, the position of said tube being determined by said diaphragm in accordance with relative pressures in said chambers.

24. Apparatus constructed in accordance with claim 23 wherein said tube is provided within the second mentioned chamber of said pair with a bleed port affording fixed limited communication between the chambers of said pair.

JEANNOT G. INGRES.
EDWARD G. HILL.

REFERENCES CITED

The following references are of record in the file of this patent:

UNITED STATES PATENTS

| Number | Name | Date |
|---|---|---|
| 2,091,046 | Hewitt | Aug. 24, 1937 |
| 2,106,483 | Hewitt | Jan. 25, 1938 |
| 2,215,172 | Christensen | Sept. 17, 1940 |